Jan. 7, 1930.　　　F. J. SPRAGUE　　　1,742,421
TRAIN CONTROL APPARATUS AND CIRCUIT ARRANGEMENT
Original Filed Aug. 7, 1919　　11 Sheets-Sheet 1

INVENTOR.
BY
ATTORNEYS.

Jan. 7, 1930.  F. J. SPRAGUE  1,742,421
TRAIN CONTROL APPARATUS AND CIRCUIT ARRANGEMENT
Original Filed Aug. 7, 1919   11 Sheets-Sheet 2
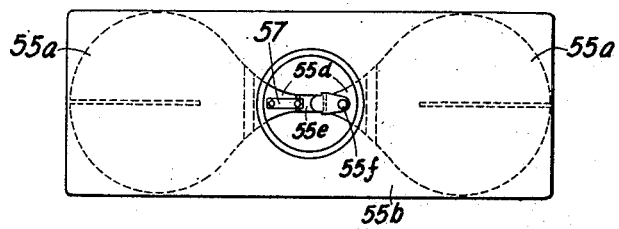
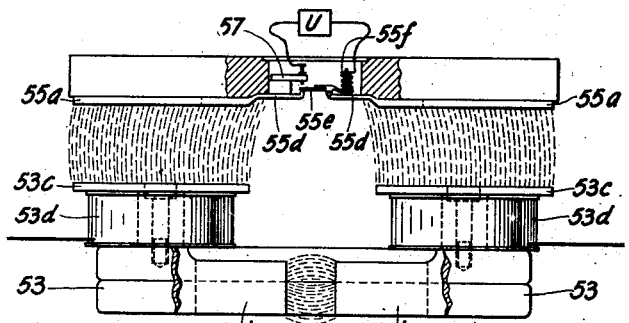
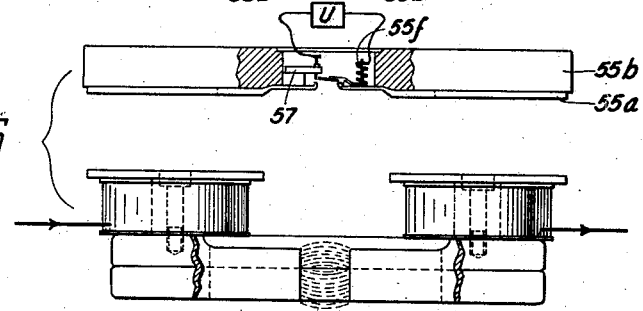
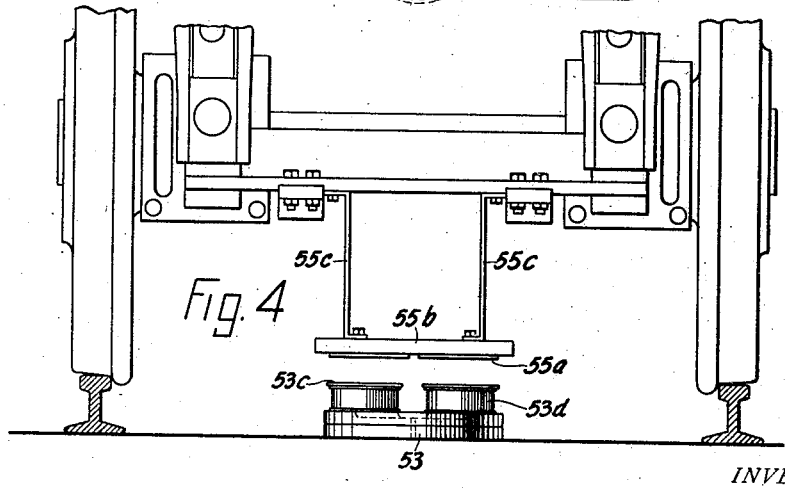
INVENTOR.
BY
ATTORNEYS.

Jan. 7, 1930.  F. J. SPRAGUE  1,742,421
TRAIN CONTROL APPARATUS AND CIRCUIT ARRANGEMENT
Original Filed Aug. 7, 1919  11 Sheets-Sheet 4
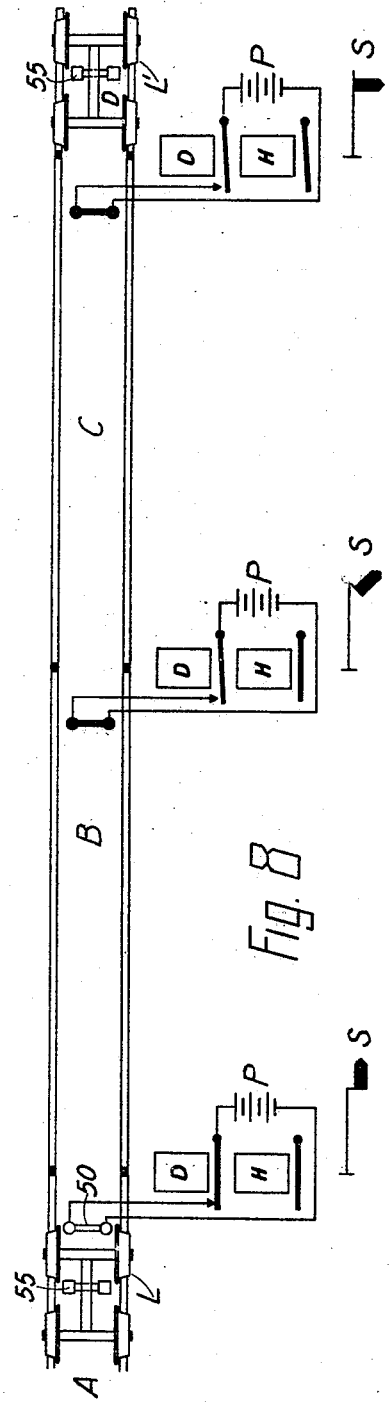
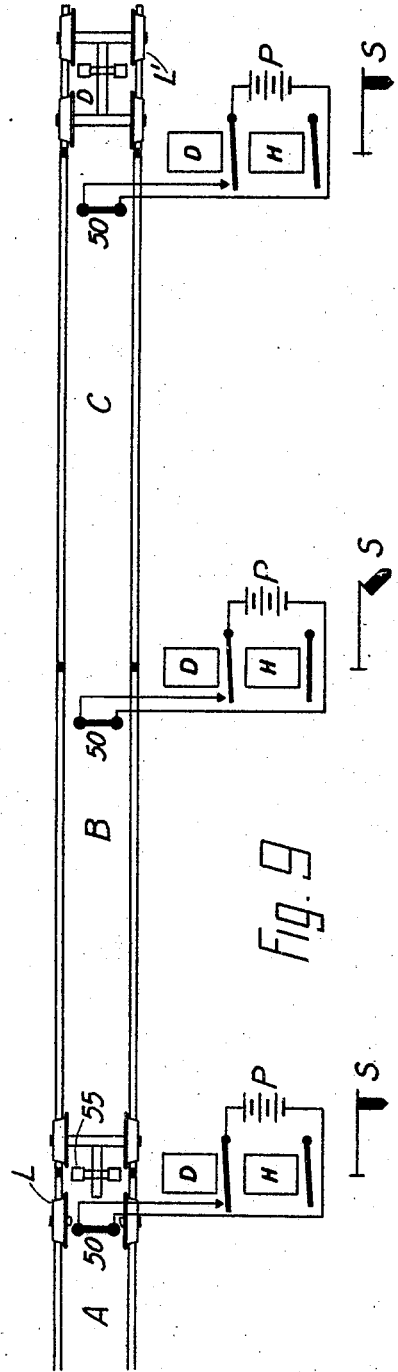
INVENTOR
ATTORNEY Jan. 7, 1930.　　　　F. J. SPRAGUE　　　　1,742,421
TRAIN CONTROL APPARATUS AND CIRCUIT ARRANGEMENT
Original Filed Aug. 7, 1919　　11 Sheets-Sheet 5

INVENTOR.
BY
ATTORNEY.

Jan. 7, 1930.    F. J. SPRAGUE    1,742,421
TRAIN CONTROL APPARATUS AND CIRCUIT ARRANGEMENT
Original Filed Aug. 7, 1919    11 Sheets-Sheet 6
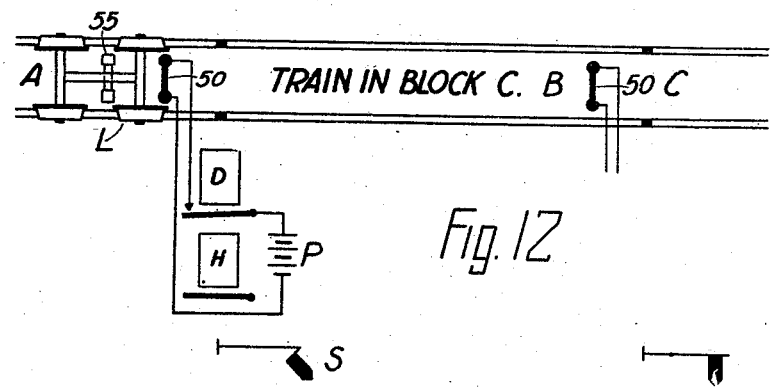
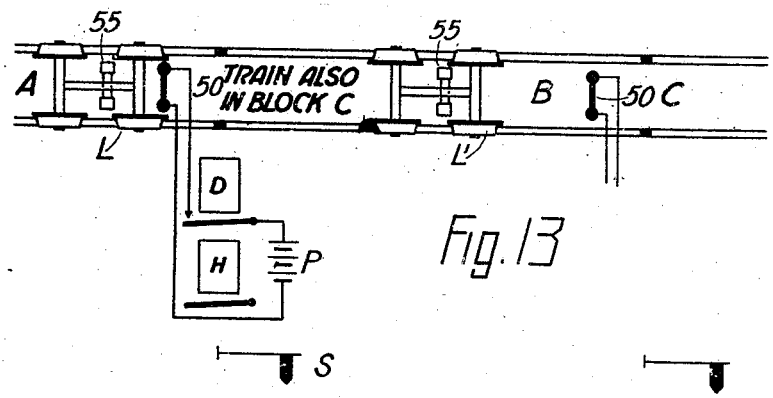
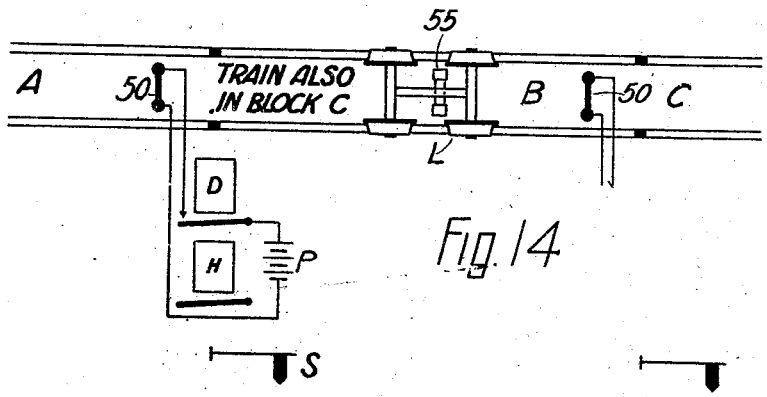
INVENTOR
BY
ATTORNEY

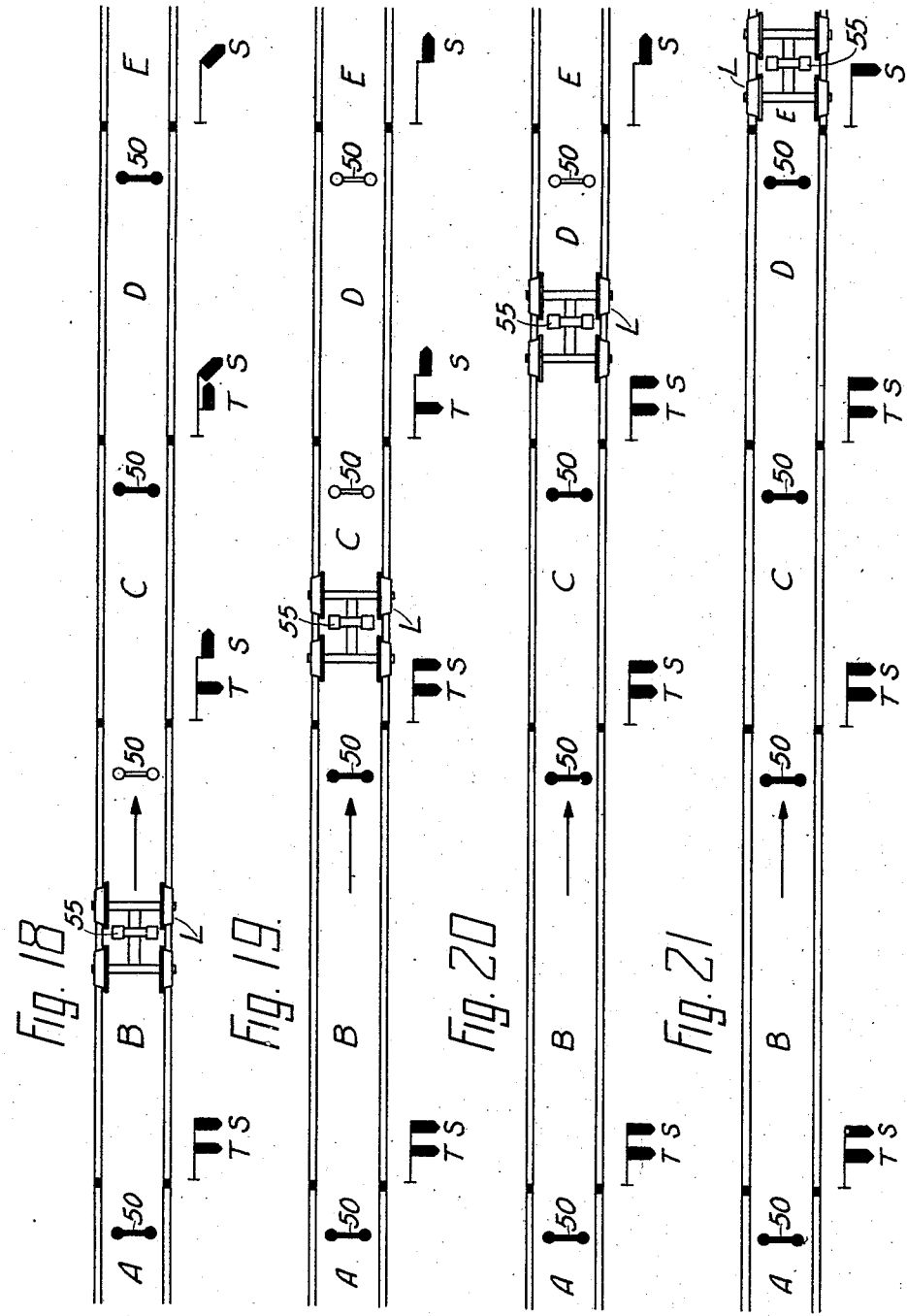

Jan. 7, 1930. F. J. SPRAGUE 1,742,421
TRAIN CONTROL APPARATUS AND CIRCUIT ARRANGEMENT
Original Filed Aug. 7, 1919 11 Sheets-Sheet 9
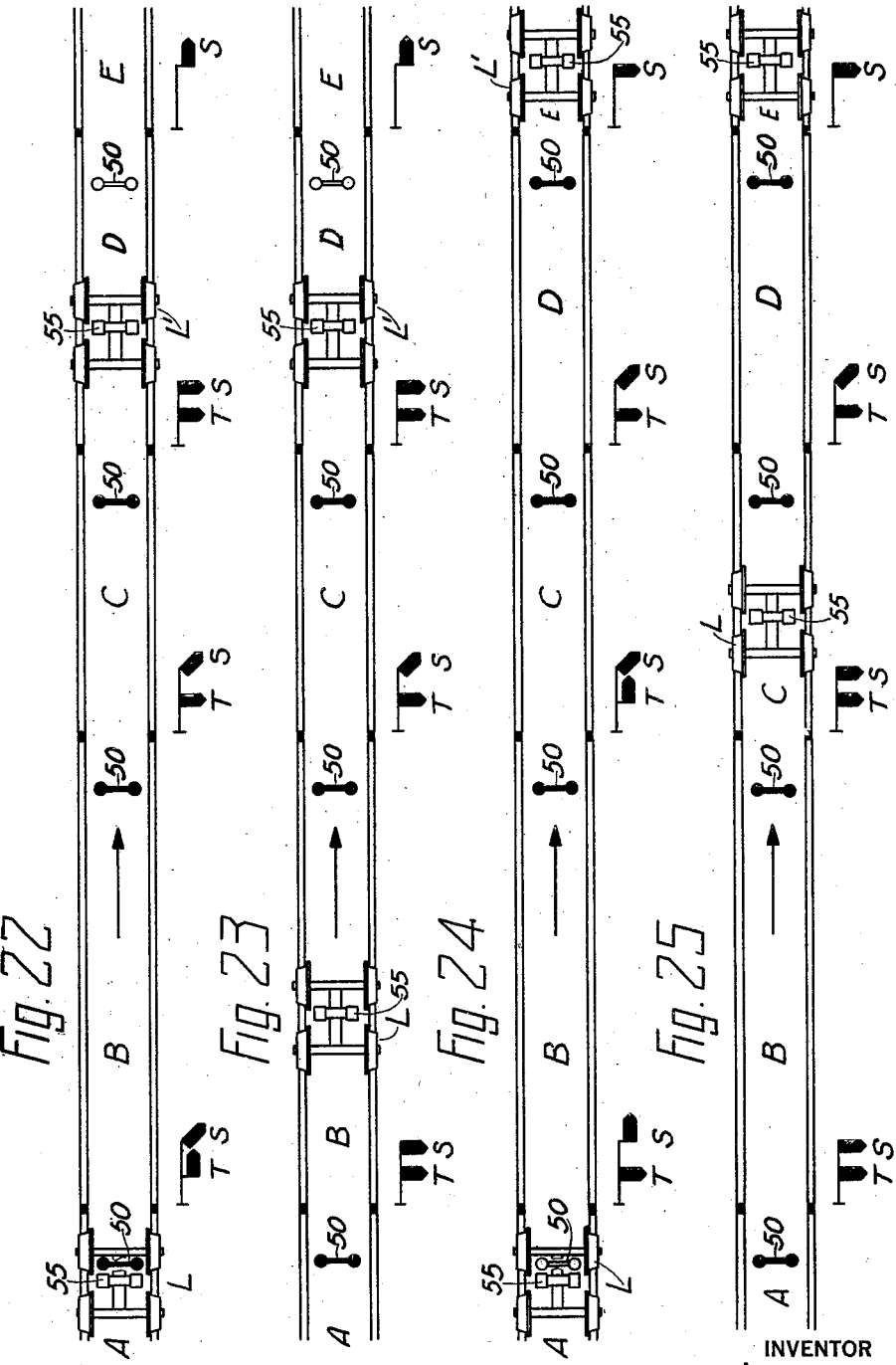

Jan. 7, 1930. F. J. SPRAGUE 1,742,421
TRAIN CONTROL APPARATUS AND CIRCUIT ARRANGEMENT
Original Filed Aug. 7, 1919 11 Sheets-Sheet 10
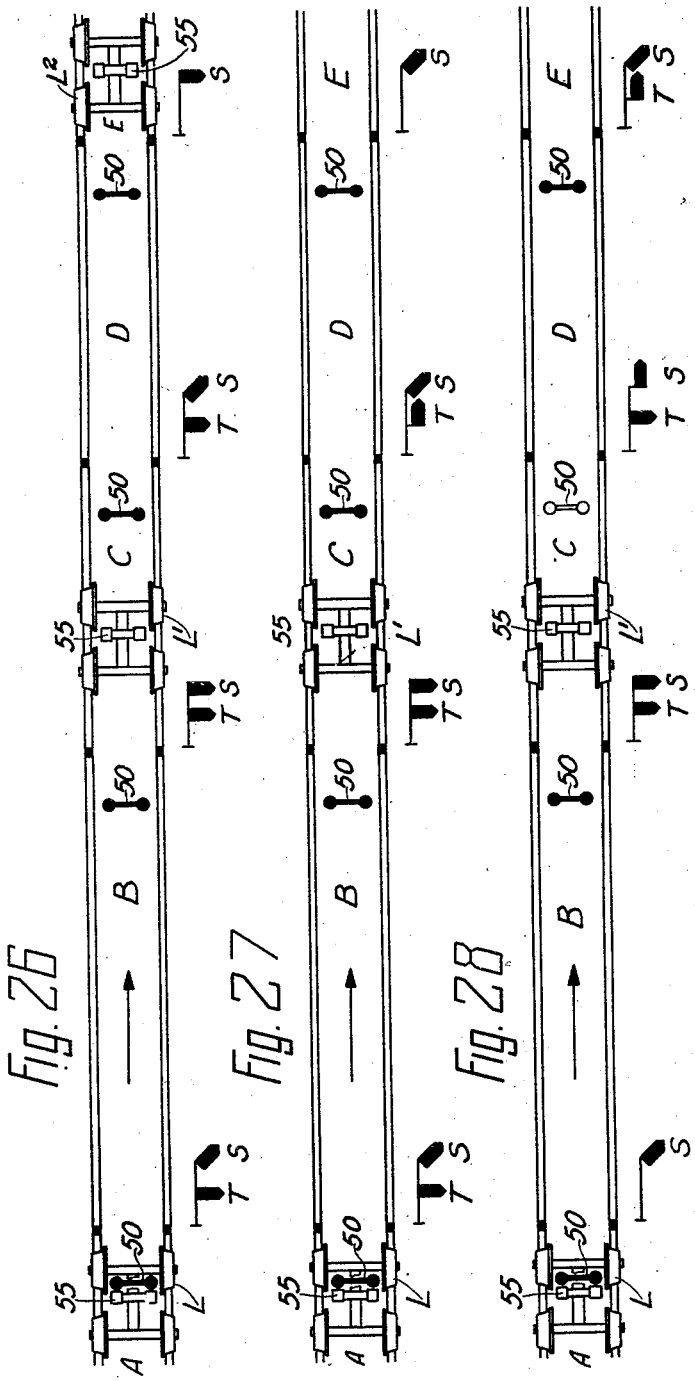
INVENTOR
BY
ATTORNEY Jan. 7, 1930.  F. J. SPRAGUE  1,742,421
TRAIN CONTROL APPARATUS AND CIRCUIT ARRANGEMENT
Original Filed Aug. 7, 1919  11 Sheets-Sheet 11
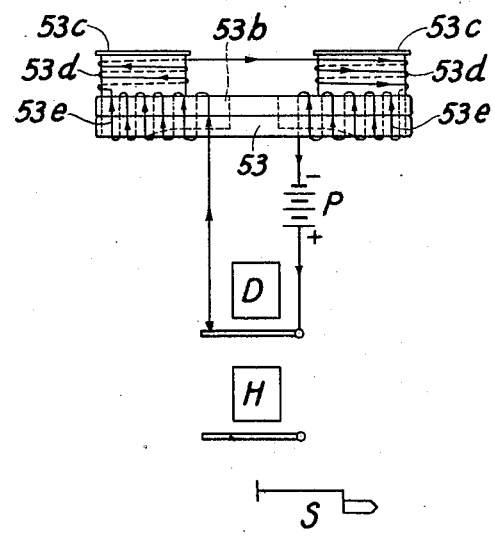
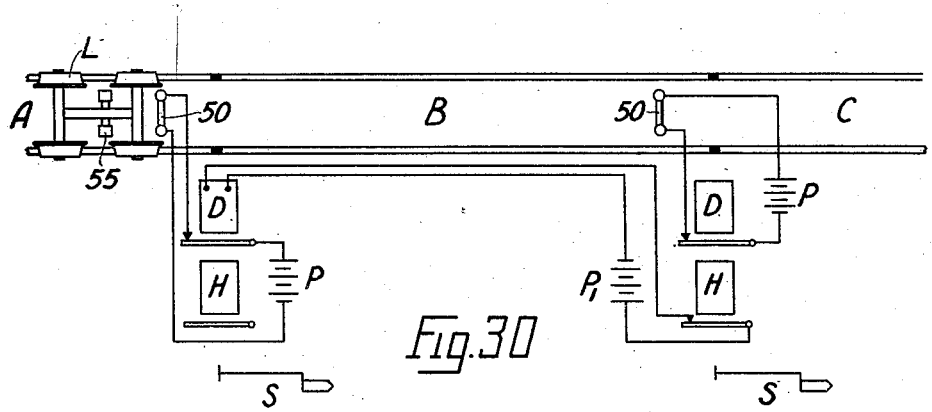

Patented Jan. 7, 1930

1,742,421

UNITED STATES PATENT OFFICE

FRANK J. SPRAGUE, OF NEW YORK, N. Y., ASSIGNOR TO SPRAGUE SAFETY CONTROL AND SIGNAL CORPORATION, OF NEW YORK, N. Y., A CORPORATION OF VIRGINIA

TRAIN-CONTROL APPARATUS AND CIRCUIT ARRANGEMENT

Original application filed August 7, 1919, Serial No. 315,880, and in Canada December 29, 1915. Divided and this application filed May 10, 1927. Serial No. 190,322.

This application is filed as a division of my prior application filed August 7th, 1919, Serial No. 315,880 for method of and apparatus for control of train movements and the subject matter thereof forms a part of the apparatus discussed in the aforesaid prior application.

The purpose of my present invention is to provide a suitable impulse device on the track for influencing car carried apparatus for the initiation of automatic braking or for the resetting of car carried parts after such initiation. In presenting this feature of the present invention the subject will be presented on the assumption that the activity developed in car carried parts as a result of passing the track impulse device is for the purpose of initiating automatic braking, but it is to be understood that in thus presenting the invention no limitation is imposed upon the use to which the track impulse device is adapted or may be put.

Train carried parts actuated from track instrumentalities for initiating and effecting automatic braking are well known in the art and are not herein illustrated, as the present invention is independent of the particular method and apparatus by which the activity developed as a result of passing a track impulse device in brake applying condition is translated into automatic braking.

For convenience of understanding, however, reference may be had to Letters Patent No. 1,581,094, granted April 13, 1926, as a division of my prior application, Serial No. 879,939, filed December 31st, 1914. That patent illustrates means for effecting an automatic service braking through the agency of standard Westinghouse equipment in which the engineer's valve is placed in a non-charging position and automatic braking effected through the direct agency of said valve. Means for forestalling said automatic braking and for resetting the train carried control parts after an automatic braking are likewise illustrated in the said patent. It must be understood however, that reference herein to the said patent is purely for illustrative purposes and not in any way constituting a limitation upon the present invention.

While I have not shown herein any train carried automatic braking parts I have indicated diagrammatically a receiver carried by the locomotive for cooperation with the track impulse device, and to illustrate some method of utilization of the activity resulting from passing the track impulse device have shown a normally closed contact carried by said receiver to be opened when the track impulse device is in brake applying condition. This likewise, however, is not intended as a limitation.

The present divisional application also has for its purpose the provision of governing means for the track impulse device, whereby it is under the control of track conditions. In illustrating this feature of the present application the impulse devices above referred to are diagrammatically illustrated as under the control of the track circuits. The general scheme of track control forming a part of this application is however independent of any particular kind of track impulse device and no limitation upon this feature of the application is to be inferred from presenting it in connection with the particular track impulse device above referred to.

In combining the track impulse device above referred to with the general scheme of track control I have herein for simplicity of showing illustrated a single track impulse device for each block. This likewise is not intended as a limitation. In carrying out this illustration I have shown a simple track layout, and also a more complicated one characteristic of a specific wayside signal layout, that known as the normally danger system, as installed on a railroad in which because of the shortness of blocks and high speed of trains of varied character satisfactory automatic braking for all classes of service cannot be assured when kept within the confines of a signal block, and where it is also desirable that the distance affected by such braking shall not be unnecessarily extended while improper brake applications must be guarded against.

Further objects of the invention will be apparent from the following description and claims.

Referring to the accompanying drawings which form a part of this application—

Fig. 3 is a plan of a receiver for cooperation with the said track magnet.

Fig. 4 is an elevation showing the mounting of a receiver such as shown in Fig. 3 on the locomotive and its relation to the track magnet.

Fig. 5 is an elevation of certain parts shown in Fig. 4, but on a larger scale with the track magnet illustrated as active.

Fig. 6 is a view simiar to Fig. 5, but with the track manget illustrated as inactive.

Fig. 8 is a diagrammatic illustration showing conventionally a section of a railroad, with locomotives thereon, including two full and two partial blocks and three-position arm wayside signals connected therewith and controlling the track impulse devices, one for each block. In this and in the following figures solid black indicates the "stop" condition of the track impulse device for initiating automatic braking in which condition it may be called "active", and the showing in outline indicates the "proceed" condition of the track impulse device which does not initiate automatic braking, in which condition it may be termed "inactive". The distant and home track relays are indicated diagrammatically and initialed "D" and "H" respectively. The control of these track relays is well known in the signal art and is not here illustrated. For purpose of uniformity the control may be considered as that of a normal danger system, altho the signal and track indication shown in this and the following figure would be the same with a normal clear signal system.

Fig. 9 is a view similar to Fig. 8 except that the rear one of the two locomotives is shown advancing from one block into the next.

Figure 10:
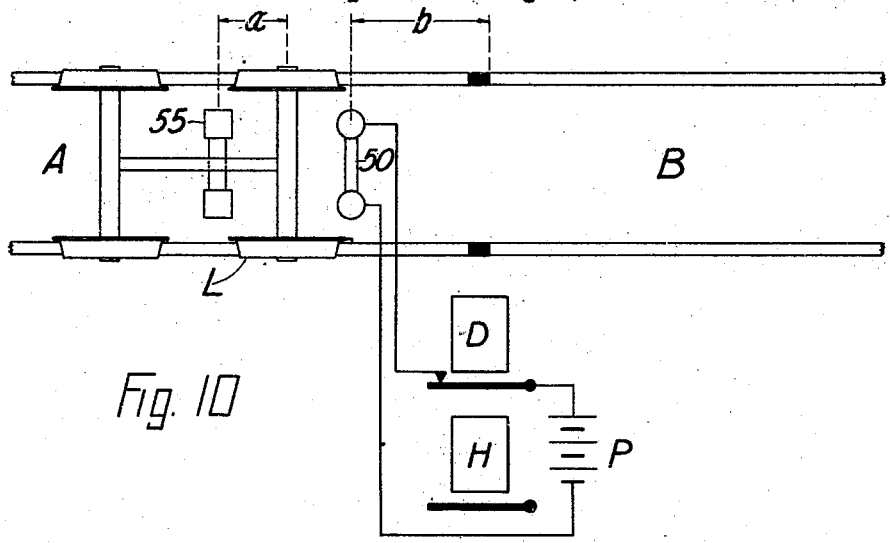

Fig. 10 is an enlargement of the left hand portion of Fig. 8.

Figure 11:
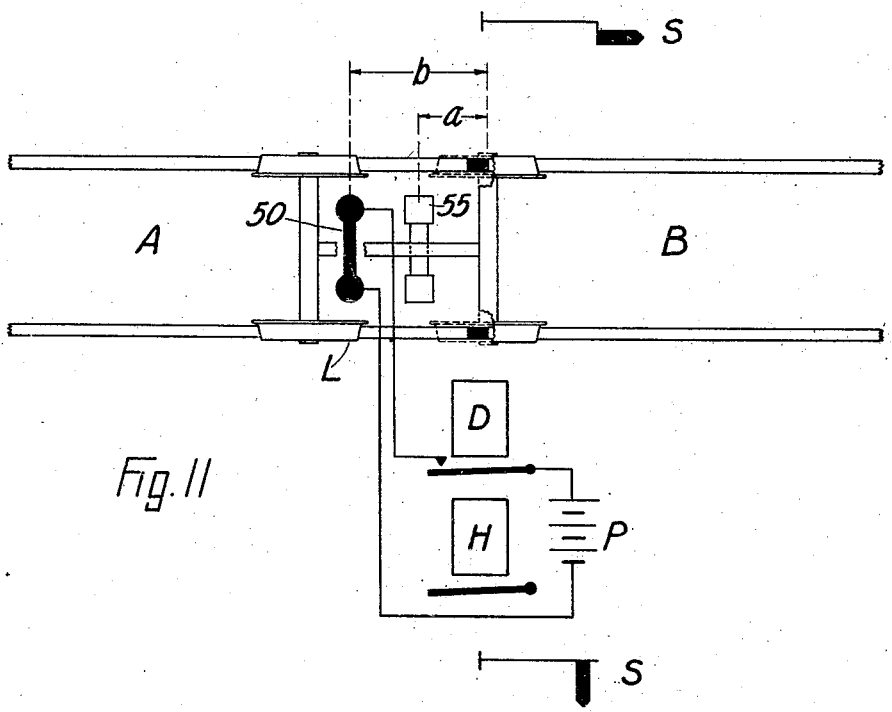

Fig. 11 is an enlargement of the left hand portion of Fig. 9.

Figs. 12 to 14 are diagrammatic illustrations showing the proceed and stop conditions of the track impulse devices with various conditions of locomotive-block occupancy.

Figure 15:
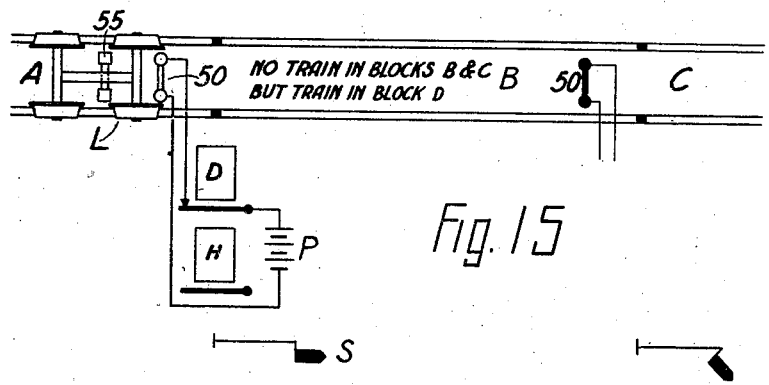
Figure 16:
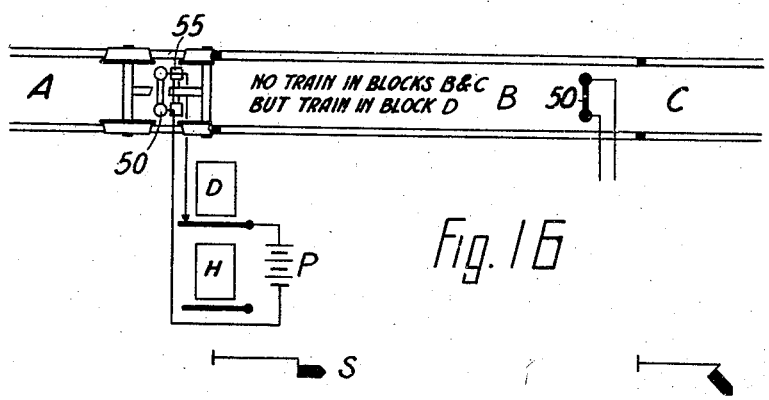
Figure 17:
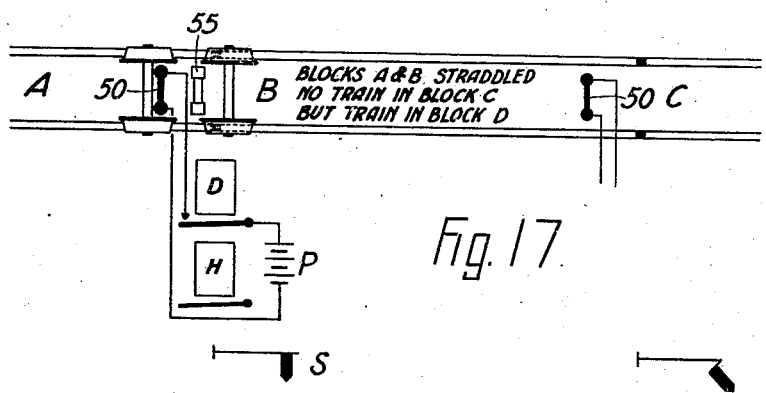

Figs. 15 to 17 are diagrammatic illustrations showing the proceed and stop conditions of the track impulse devices as the locomotive passes from one block into another when there are two clear blocks ahead of it.

Figs. 18 to 28 are diagrammatic illustrations showing conventionally the correspondence of typical track impulse device and signal indications for varying track movements, on a railroad equipped with a normal danger system of automatic wayside signals and the rear guard overlap necessitated by short blocks and dense traffic. Each of the figures shows one long and two short blocks, and the ends of two other blocks, with one or two (and in one case—Fig. 26—three) locomotives, and illustrates the location and condition of the track impulse devices relative to the signal indications.

Figure 29 is a diagrammatic illustration showing the traffic control of the coil 53$^e$.

Figure 30 is a diagrammatic illustration showing the control of the distant relay D by the home relay H of the block in advance.

Figure 1:
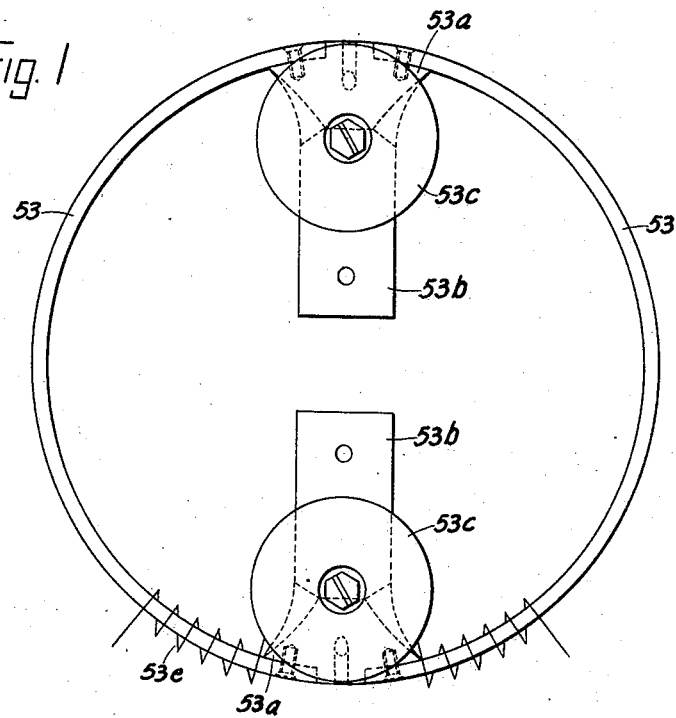
Fig. 1 is a plan of the track magnet specifically referred to herein.
Figure 2:
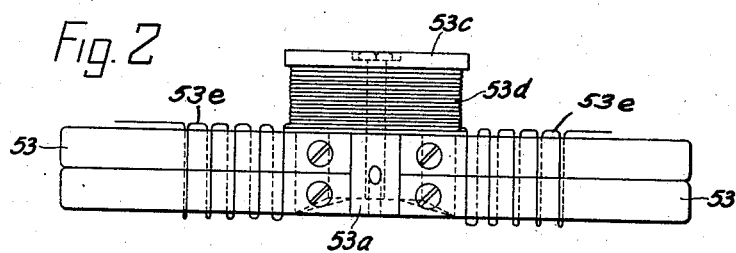
Fig. 2 is an elevation of the track magnet of Fig. 1.

The preferred construction and form of track impulse device comprises the track application magnet shown in Figs. 1 and 2. As there indicated, such a magnet consists of a plurality of permanently magnetized bars or plates, assembled in groups into two semi-circular yokes 53, 53, disposed in a horizontal planes, the yokes having their like poles attached to and connected together by soft iron pole pieces 53$^a$, 53$^a$. Each of these pole pieces has projecting centrally therefrom in the plane of the yokes, a stabilizing pole 53$^b$, and also has projecting from its upper face a working pole surmounted by a flange 53$^c$ and surrounded by a neutralizing coil 53$^d$.

The faces of the stabilizing poles are comparatively near to each other and have considerable area, their dimensions and those of the yokes being determined by certain known laws which govern the life of the magnetic assembly. By this arrangement there is established a magneto-motive force which at all times sends magnetic lines of force across the space between the stabilizing poles, as shown in Figs. 5 and 6. Normally, also, a magnetic field exists above the working pole flanges, as shown in Fig. 5, the lines of force in which may be diverted to, or passed through, any other mass of iron in proximity thereto, as, for example, the locomotive receiver shown in that figure.

It will be noted that by using the compound magnet herein described, the creation of a magnetic field above the magnet is inherent in the structure itself; that the coils 53$^d$, 53$^d$ serve as a means for changing the characteristics of such field to indicate a safe condition; and that the stabilizing poles and the working poles are in the path of the magnetic flux created by the permanently magnetized yokes, and are also in the path of the flux created by the coils themselves.

While many other forms of magnet assembly are possible, the one described is very compact and is of such shallow dimensions that it may be supported on and spiked to the tops of the ties, and when so positioned the tops of the working poles will be approximately in the plane of the tops of the traffic rails. They may also be easily protected by a casing of cement or enclosed in a non-magnetic box.

With the construction shown it is possible, by sending a current in the proper direction through the coils surrounding the working poles, to diminish, completely neutralize, or actually reverse the magneto-motive force in such poles without destroying or materially affecting the magnetism of the yokes.

When the magneto-motive force is simply neutralized the magnetic field above the working poles of an application magnet disappears, as in Figs. 4 and 6, and it is a matter of indifference whether the receiver on the locomotive is above said magnet. In ordinary practice, however, exact neutralization would generally not occur, but with the actual receivers used if the field over the working poles is sufficiently weak it may be normal or reversed without creating a flux through the receiver sufficient to operate certain parts hereafter described. This very fact makes possible practical operation with a considerable variation in the current strength used in the neutralizing coils, whether such variation of current strength results from changes in the condition of the battery supply or in resistance of the lines due to temperature, sag or distance.

Figure 7:
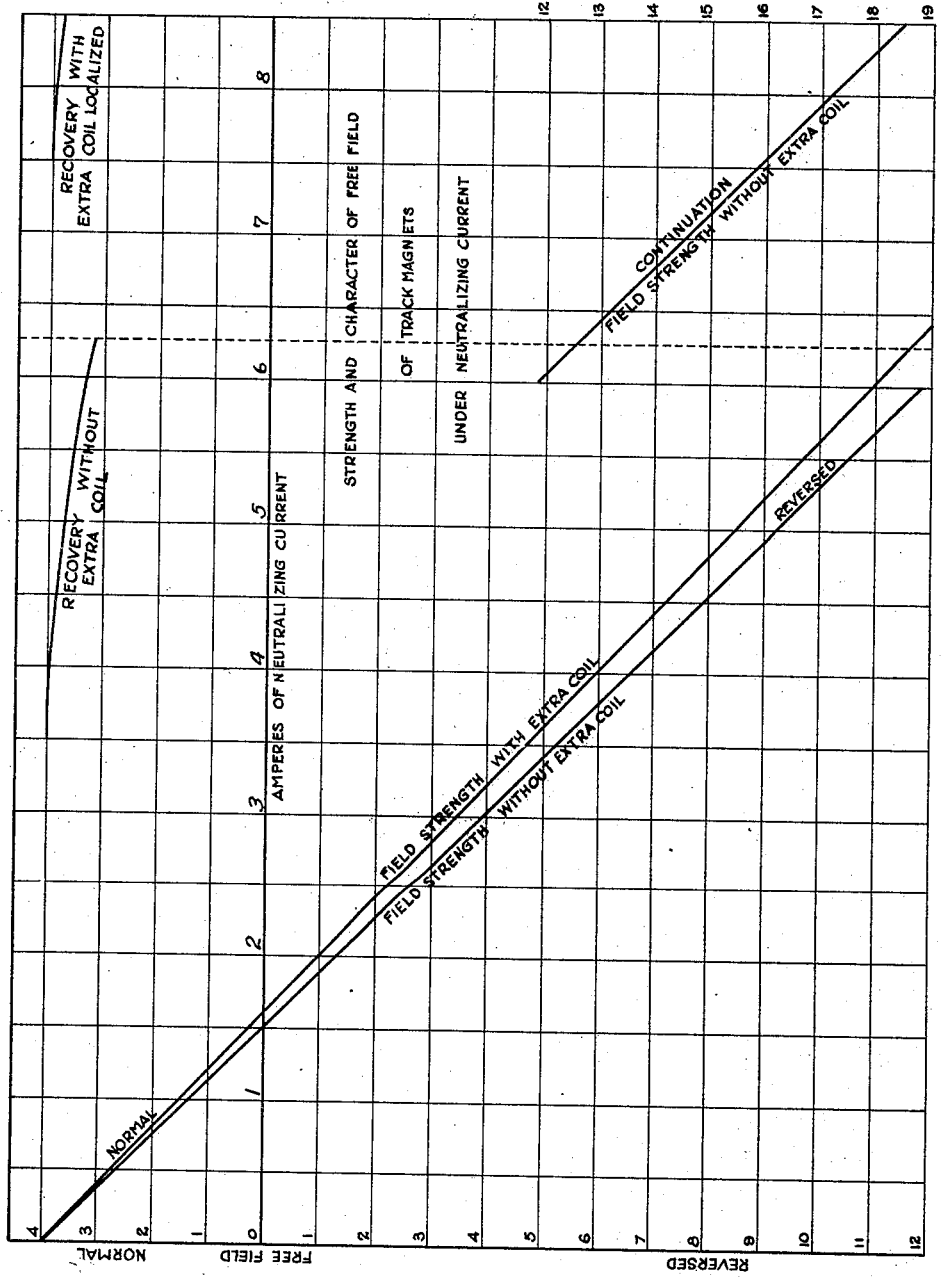
Fig. 7 is a plot illustrative of the cycle resulting from the energization and deenergization of track magnets such as shown in Figs. 1 and 2.

Fig. 7 illustrates, from actual tests, the relative density, normal or reverse, of the free field existing above the working poles of an application track magnet in the absence of the locomotive receiver, when various strengths of neutralizing current are used. This density may run from a normal represented by, say, a unit 4 to a maximum of 18½ reversed (indicated by the ordinates), with a variation of current strength from 0 to 8½ amperes (indicated by the abscissæ) as is shown by the line "Field strenght without extra coil", and its transferred continuation.

A peculiar thing of note is that the neutralizing and reversing effect is a linear function of the strength of the current, and it has also been demonstrated by experiment that it matters little how a given total number of ampere-turns is distributed on the two working poles.

Fig. 7 further indicates by the line "Recovery without extra coil", the density of the field above the working poles after reversal and upon the cessation of the neutralizing current.

It will be seen that up to a reversal represented by about 6 units the recovery of the normal free field is practically undisturbed, but that as the reversal is increased in amount the recovery is not to full value.

By winding a small extra coil (indicated as 53ᵉ in Figs. 1 and 2) on the magnetized yokes, either distributed along the yokes or localized near their junction with the pole pieces, and including the coil in the circuit of the neutralizing coils, the degree of possible reversal with complete recovery of normal field when the current is broken can be more than doubled. The variation in density above the working poles with such a coil present is represented in Fig. 7 by the line "Field strength with extra coil". In regular operation it has been found that since the reversal will probably not exceed a quarter or a third of the unit of Fig. 7, the use of the extra coil is not needed, although if for any reason it were desired to reverse the fields to a material degree such a coil might be found advisable. Such a coil can also be used to stiffen a weakened magnet, and may if desired be readily included in the track circuits by itself.

If with a normal working field of a density equal to 4 units the receiver on the locomotive were adjusted so that it would not be operated by either a normal or reversed field of under say 1⅓ units density there could be an extreme variation of neutralizing current of 100 per cent, an amount outside of reasonable probability.

As indicated in the preceding description, a receiver 55 is illustrated for cooperation with the track impulse device, one receiver to be mounted on each locomotive. The receiver illustrated consists of two flat pieces 55ᵃ, 55ᵃ of soft iron, slotted to break up eddy currents and so disposed in the same horizontal plane that the two pieces of each receiver will simultaneously cover, respectively, the two working poles of the track magnet with which it is desired that the receiver cooperate when brought thereover by the travel of the locomotive. In Figs. 3 to 6 these two pieces are shown as magnetically separated from each other and supported in any convenient manner, one method of so doing being to attach them to the lower side of an insulating slab 55ᵇ, supported by suitable brackets 55ᶜ, 55ᶜ from the frame of the locomotive, in such a position that the pieces are carried at a suitable distance above the top of the working poles of the track magnets. In practice, good results have been obtained with distances up to eight inches, although three and one half inches afford sufficient clearance. The two pieces, therefore, constitute a collector for the magnetic flux due to an active track magnet.

As shown in Fig. 3, the soft iron pieces have their adjacent sides formed into horns 55ᵈ, 55ᵈ located below a hole formed in the block 55ᵇ. The magnetic reluctance of the collector so formed is therefore localized at the gap. In the gap between the horns is a soft iron, non-polarized armature 55ᵉ, pivoted to one horn and normally held away from the other horn and against a back contact (marked 57) by a suitable spring 55ᶠ.

When, however, the two pieces on the same receiver are simultaneously over the opposite poles of an active track magnet the magnetic lines of force existing thereover will be concentrated by the horns, and this will tend to draw the free end of the armature against its corresponding horn and will open the back contact.

Many refinements and also modifications are possible in the constructon and grouping of the receiver parts, and means may be provided to protect the receiver from injury and interference.

The system of train control herein described comprises in principle, whatever the detail construction, the combination of a track element under control of a wayside signal system preferably conditioned by traffic movement, and a vehicle-carried element intermittently registering with the track element in such fashion as to form inductively a magnetic couple whenever the track element is in an active, or "stop", condition at the time of such registration, to initiate, by a change of flux in the receiver or the couple, an automatic application of the brakes, and it is evident that this combination may be effected in various forms without changing the principle of operation.

Suitable means for automatically applying the brakes under the control of the normally closed contact 57 on the receiver are indicated (Figs. 5 and 6) by the symbol "U". This matter has already been referred to in the preceding description to which reference may be had without repetition at this point. Thus, for example, referring to the aforesaid Patent No. 1,581,094, the normally closed receiver contact 57 hereof may be considered the normally closed contact 451 of the patent.

The track magnet referred to is preferably under the automatic control of a wayside signal system either by the distant relay or the signal arm or both. It is here specifically illustrated, Figs. 8 to 17 inclusive, as under the control of the distant relay by means of a contact governed thereby in series with a battery, the two being in series with the coils 53$^d$, 53$^d$.

The condition of the track magnet is shown as active when the signal arm (or upper arm where overlap is used) is not in clear (vertical) position. All of the track magnets are of similar unit strength and effective to initiate impulses in the locomotive receivers at all train speeds even if the train is standing still. For clarity of illustration the track magnets are shown installed on a double track railroad divided into signal blocks and equipped with electrically actuated caution and danger, or distant and home, signals, the direction of traffic being from left to right in the figures.

The track magnet is illustrated as just to the rear of the caution signal at the entrance to every block, about 50 feet in the rear of the beginning of the block it protects.

It will be understood that under special conditions, as on sidings, crossovers, or on interlocked territory the location of the track magnet will be varied in accordance with conditions there obtaining. Generally speaking but subject to exceptions, the track magnet would be placed where caution signals should be given.

When in position the track magnet should be properly protected and guarded against accidental external injury, in such a manner as indicated for example in Sprague British Patent 18,213 of 1915.

The actual conditions and relation of the relays to the signal and inter-connecting circuits, as well as the track relays, are not shown, as these are familiar to all signal engineers and the detail practice of installation varies on different railroads. It is evident that the connections of one or the other of the magnets may be carried through a plurality of relays, and through contacts operated by the signal blades to effect any particularly desired limitations.

Looking now at the specific layout of track conditions herein illustrated the following observations are to be noted.

Fig. 8 illustrates a locomotive L at the rear of block A about to enter block B, and another locomotive L' in block D at the entrance thereof. Under these conditions it will be seen, by reference to the indications of the three-position signal arm, that the signal is at clear at the beginning of block B, giving warrant for proceeding at full speed, and that its corresponding track magnet 50 is inactive; that the signal at the beginning of block C is at caution, and its corresponding track magnet active; and that the signal at the beginning of block D is at stop and its corresponding track magnet active. The block D is protected by two track magnets, one near the end of block B and the other near the end of block C. So long as the locomotive L' remains in block D and this condition of track magnets and wayside signals persists the locomotive L should be permitted to advance into block B in accordance with the clear signal at the beginning of that block and its corresponding inactive track magnet.

With the track clear ahead the conditions set up in block C by the entrance of the locomotive L' into block D, i. e., the setting of the signal at the beginning of block D at Stop and the rendering active of its corresponding track magnet near the end of block C, are established when the forward wheels of the locomotive L' straddle the rails of block D and shunt out the corresponding track relays. A similar condition arises respecting locomotive L in passing from block A into block B. This is illustrated in Fig. 9, in which the locomotive L has partly entered block B, has set the signal at the beginning of block B to stop and rendered active the track magnet 50 near the end of block A. The receiver 55 in locomotive L is forward of the track magnet 50 and as shown will not be affected thereby.

The transition conditions, therefore, are all important. I have illustrated this on a larger scale in Figs. 10 and 11.

In Fig. 10 the locomotive L is approaching the entrance of block B, and the receiver 55 is in the rear of the track magnet. In Fig. 11, however, the forward wheels of the locomotive are just entering block B and the signal is set at Stop, with consequent activation of the track magnet 50. Under these circumstances if the receiver had not passed over the track magnet the locomotive would get an automatic brake application when it did pass, despite the fact that it has been proceeding under a clear signal—in short, it would have "stepped on its own toes".

But the condition of operation requires that locomotive L shall pass clear, and hence if the receiver is in the rear of the forward wheels at say distance $a$, the distance $b$ from the signal joint to the track magnet should be greater than the distance $a$ from the forward wheels of the locomotive to the receiver, unless there is such a delay in action as to permit shortening up of this distance. Since, however, trains at all speeds must be permimtted to proceed under a clear signal without unnecessary automatic braking this interdependence of distances or relations should rule.

It will be apparent that as the distance from the forward wheels of the truck to the receiver on the locomotive is diminished the distance of the track element in rear of the signal joint may likewise be lessened. If for example, the receiver is carried directly over the front axle the track element may be placed very near the signal joint, and it may be placed at such joint if the receiver is carried in advance of the forward wheels, as for example under the pilot. The above suggestion of placing the track magnet at a distance of about 50 feet in the rear of the beginning of the block it protects should therefore be understood as illustrative of a location of the track magnet permitting the mounting of the receiver on the locomotive as may be desired. The term "locomotive" is not used in a limited sense, but is intended to cover any complete motor unit—as for example a steam engine and its tender.

Generally speaking, therefore, under all circumstances, at the moment of the short-circuiting of the rails by the forward wheels of the vehicle the receiver on the locomotive must be so situated that it will pass over a track element controlled to a stop condition by entrance of the locomotive into the block before the activation of the track element resulting from such entrance can affect the receiver, regardless of speed.

Of course, as here illustrated the conditioning of track elements 50 to stop will be effected by any shunting of the track circuit by the wheels of a locomotive in either of the advance blocks, regardless of whether it is standing still or moving, and likewise regardless of the heading of the locomotive or its direction of movement. The controlling action and conditions established are therefore not limited to one-way movement on double track railroads but will equally govern for two-way movement on a single track.

This requires some cooperative relation in the placing of the track impulse devices and the receivers and to this end a symmetrical arrangement is preferred in which all of the track impulse devices and the receiving devices are placed respectively on the longitudinal center of the track and the train in such relation that a cooperative registration is provided for with the locomotive headed in either direction. This provides for a minimum of track and locomotive equipment.

Figs. 12, 13 and 14 illustrate the condition when there are trains in advance of a moving train. In Fig. 12, for example, locomotive L in block A as it proceeds will encounter an active track magnet at the end of its block because of the presence of a train in the second block C in advance, which occupancy has caused the distant relay D to drop.

In Fig. 13, since there is also indicated a locomotive in block B as well as in block C, locomotive L would have passed active magnets further in the rear.

In Fig. 14 locomotive L' has proceeded into block C, and locomotive L into block B, each continuing the stop signals and the already established active condition of the track magnets.

Figs. 15, 16 and 17 illustrate somewhat more fully what is shown in Fig. 11, in the progress of a train running with a clear signal and normal blocks into the next block in advance.

In Fig. 15 the signal is clear, the track magnet 50 for block B near the end of block A is inactive, and locomotive L is in the rear of both signal track joints and track magnet 50. The signal at the beginning of block C is at caution and the track magnet near the end of block B is in active condition, on the assumption that there is a train in the block next succeeding block C.

In Fig. 16 the forward wheels of the locomotive are about to enter the advance block but have not yet made contact with its rails. The receiver, however, has already passed over the corresponding track magnet, which is still inactive.

In Fig. 17 the wheels have advanced beyond the signal track joints, the signal has been set at Stop, and the corresponding track magnet is also active but the locomotive receiver has passed this magnet.

Figs. 18 to 28 show, on a five block section, various typical conditions which may exist on a standard railroad operating ordinarily with one-way traffic and protected by a normal-danger system of fixed wayside signals which because of shortness of blocks, density of traffic and high speed of trains requires a rear guard overlap. The regular signals S are of the three-position blade type, the additional signal blades T being for special indications.

With this system are shown the corresponding track magnets 50 which are also under traffic control, and normally at "Stop", being cleared, as are the signals, as a train proceeds along the track.

Extended descriptions are unnecessary inasmuch as the corresponding conditions of wayside signals and track magnets are clearly indicated. Generally speaking, it will be noted that in all cases there is a track magnet in the rear of the signal joint at the beginning of the block which it is to protect, that this magnet is in proceed position only when the next signal S in advance and nearest to it is at clear, and that when a signal is at either Caution or Stop the application magnet is also at "Stop". It is also to be noted that there may be two caution signals in advance of a clear signal and two clear signals in advance of a locomotive, and that even when the line is clear in rear of a moving train, as well as in the distant blocks ahead of it, the signals and likewise the magnets remain at Stop. This is because a normal danger system of signals is used—that is, one in which all signals normally are in a stop position, and are set by a free running locomotive to clear and caution indications in the blocks immediately in advance provided there is no other train near by.

Referring specifically to the figures:

Fig. 18 shows a single locomotive L in block B, which has set the signal and track magnet in its rear at "Stop," and has cleared the signal in block C, with its corresponding track magnet 50 near the end of block B, while the signals for blocks D and E are at caution and the corresponding track magnets are active.

In Fig. 19 locomotive L has proceeded into block C over track magnet 50 near the end of block B in proceed condition, but now the signals and track magnets in its rear are at "Stop," while the signals next in advance, those for block D and E, have been cleared because no train is within danger distance in advance.

In Fig. 20 locomotive L has advanced into block and all signals and the corresponding track magnets in the rear are at "Stop," but that covering block E has cleared and this track magnet 50 near the end of block D is in proceed condition.

In Fig. 21 locomotive L has advanced into block E and all signals and the track magnets controlled thereby in its rear are active.

Fig. 22 shows two locomotives, L in block A and L' in advance of it in block D. There being no locomotive within danger distance ahead of locomotive L' its signal S and the corresponding track magnet 50 are at clear, or proceed, but the signal for block D is at Stop and those for blocks B and C are at Caution, the corresponding track magnets near the ends of the next blocks B and A in the rear being active.

In Fig. 23 locomotive L has advanced into block B, although it has passed over a live track magnet near the end of block A, where it has received a braking impulse. It has set the signal in its rear at Stop, and the corresponding track magnet near the end of block A has been continued in active condition. The track magnets between locomotives L and L', controlled in accordance with the signals at Caution and Stop, are active, while that immediately in advance of locomotive L' is inactive.

In Fig. 24 locomotives L and L' are shown in blocks A and E respectively, but while the signals in the rear of locomotive L' for blocks E, D and C show respectively Stop, Caution and Caution, with the corresponding track magnets active, the signal S of block B and the track magnet 50 at the end of block A controlled in accordance therewith have been cleared and locomotive L is free to move on into block B.

In Fig. 25 locomotive L has proceeded through block B into block C, passing over an active track magnet near the end of block B. It is now opposed by a caution and stop signal and by the active track magnets.

Fig. 26 shows three locomotives, in blocks A, C and E respectively, locomotive L' with a caution and a stop signal and two active track magnets against it, and locomotive L with a similar condition ahead of it.

In Fig. 27 locomotive L² of Fig. 26 has moved forward into the next block and signal S of block E has gone to Caution, but the two track magnets in advance of locomotive L' are still active.

In Fig. 28, which corresponds with Fig. 27 in that locomotives L and L' are shown as in blocks A and C, the signal S of block D and the corresponding track magnet 50 near the end of block C are at clear or proceed, on the assumption that locomotive L² of Fig. 19 has moved forward another block.

In Figure 29 the energizing circuit for the neutralizing coil 53$^d$ and the extra coil 53$^e$ (for the latter only for the halves of the coil towards the front of the drawing) is shown.

In Fig. 30 the control of the distant relay

D at the entrance of block B by the home relay H of the advance block (at the entrance of block C) is indicated.

In a normal clear system the signals ahead of a moving train show similarly as here illustrated between trains at a suitable distance from each other, Clear being the normal signal, set at Stop and then to Caution and Clear as a locomotive moves on.

While the illustrations given in the preceding description have, for definiteness, been determined as they would obtain in a normal danger signal system, they are equally adaptable to a normal clear system, for with either type of signal system the track magnets may be operated, if desired, upon a normal danger system in so far as they themselves are concerned.

In all the combinations shown in the various track figures it will be noted that a train is always protected by at least two, and sometimes by even three or four active track magnets, according to the amount of overlap, although there is but one magnet in each block. Protection by at least two magnets is desirable for safe operation, and as there is only one magnet installed per block two active magnets in the rear of an occupied block should be provided for by some interlocking system.

The foregoing detailed description has been given for clearness of understanding, and no undue limitations should be deduced therefrom, but the appended claims should be construed as broadly as permissible in view of the prior art.

Having thus described my invention, what I claim and desire to secure by Letters Patent is:—

1. In an automatic train control system for railroads having tracks divided into blocks each provided with a normally closed track circuit, a trackway element near the end of each block comprising a permanently magnetized yoke disposed crosswise of the track and having projections affording a leakage path for flux, coils associated with the yoke and adapted when energized to divert the permanent flux through the leakage path and thereby neutralize the external field above the yoke, a source of current and an energized circuit for the coils of each track element controlled by the track circuit of the block next in advance of the corresponding block, a car element comprising spaced flux collecting pole pieces arranged to pass over the yoke of the track element, a biased armature adapted to be attracted in opposition to its bias by flux from the track element through said pole pieces, and means for automatically applying the brakes governed by said armature.

2. A track element for train control systems comprising a permanently magnetized yoke disposed crosswise of the track and having horizontally disposed pole pieces near the level of the track rails, said yoke having projections in the plane of said yoke affording a leakage path of lower reluctance than between said pole pieces, coils between the pole pieces and said projections, and traffic controlled means for energizing said coils whereby the permanent flux of the yoke is diverted through the leakage path and the external field above the pole pieces is neutralized when said coils are energized under clear traffic conditions.

3. A compound magnet consisting of pole pieces and a permanently magnetized yoke, the pole pieces comprising stabilizing poles approaching each other in the plane of the yoke and working poles with neutralizing coils thereon projecting from the plane of the yoke.

4. In a train control system, as a means for imparting impulses from the right of way to the train, a compound magnet having a horizontally disposed permanently magnetized yoke and having pole pieces, the pole pieces comprising horizontally disposed stabilizing poles approaching each other and vertical working poles with neutralizing coils thereon.

5. In a train control system, as a means for imparting impulses from the right of way to the train, a compound magnet having two horizontally disposed permanently magnetized yokes, the like poles of which are connected by pole pieces, the pole pieces having horizontally disposed stabilizing poles approaching each other and vertical working poles with neutralizing coils thereon.

6. A compound magnet consisting of pole pieces and a permanently magnetized yoke, coils on the pole pieces for neutralizing the normal free flux between the pole pieces, and a coil on the permanently magnetized yoke for imparting magnetism thereto.

7. In an automatic train control system, the combination of a unitary track element comprising a plurality of permanent magnets like poles of which are joined to common pole pieces, and means under control of traffic conditions for neutralizing the magnetic flux in the pole pieces and for simultaneously increasing the flux in the permanent magnets.

8. In an automatic train control system, the combination of a unitary track element comprising a plurality of permanent magnets like poles of which are joined to common pole pieces, a leakage path between the poles a part of which is of low reluctance, and means under traffic control for neutralizing the free magnetic field above the pole pieces and for simultaneously increasing the flux in the permanent magnets and in the leakage path.

9. In an automatic train control system, the combination of a unitary track element comprising a plurality of permanent magnets symmetrically disposed, like poles of which are joined to common pole pieces, a leakage path composed partly of iron of low reluctance and an air gap in series therewith, and means under traffic control for neutralizing the free magnetic field above the pole pieces and for increasing the flux in the permanent magnets and the leakage path.

10. In an automatic train control system, the combination of a unitary track element comprising a plurality of permanent magnets like poles of which terminate in common pole pieces, a leakage path partly of iron connecting the pole pieces to stabilize the permanent magnets, and means under traffic control for simultaneously neutralizing the free magnetic field above the pole pieces and increasing the magnetic flux in the leakage path.

11. In a train control system, as a means for imparting impulses from the right of way to a train, a compound magnet comprising a plurality of horizontally disposed permanent magnets, the like poles of which are connected by pole pieces, the pole pieces providing a free field and having horizontally disposed stabilizing poles, and coils associated with the assembly for diverting the flux from the free field through the stabilizing poles and for reinforcing the magnetism of the permanent magnets.

12. In a train control system, vehicle carried devices and trackway devices adapted to form a magnetic couple, said devices including portions which are slotted to prevent the formation of eddy currents.

13. In an inductive train control system, cooperating impulse transmitting elements and impulse receiving elements, located partly on the vehicle and partly on the track, said elements comprising metallic structural members which are slotted to break up eddy currents.

14. In an inductive train control system, impulse transmitting trackway elements and vehicle carried impulse receiving elements, said elements forming together a magnetic couple when brought into a cooperative relation, and means to prevent the formation of eddy currents in said elements when in such relation.

15. In an inductive train control system, car-carried elements and trackway elements coupled with each other by a magnetic flux when brought into cooperative relation, said elements comprising metallic structural parts which are perpendicular to the main direction of the magnetic flux when said elements cooperate, and means to prevent the building up of eddy currents in said structural parts when such cooperation takes place.

Signed at New York, N. Y., this 7th day of May, 1927.

FRANK J. SPRAGUE.